UNITED STATES PATENT OFFICE.

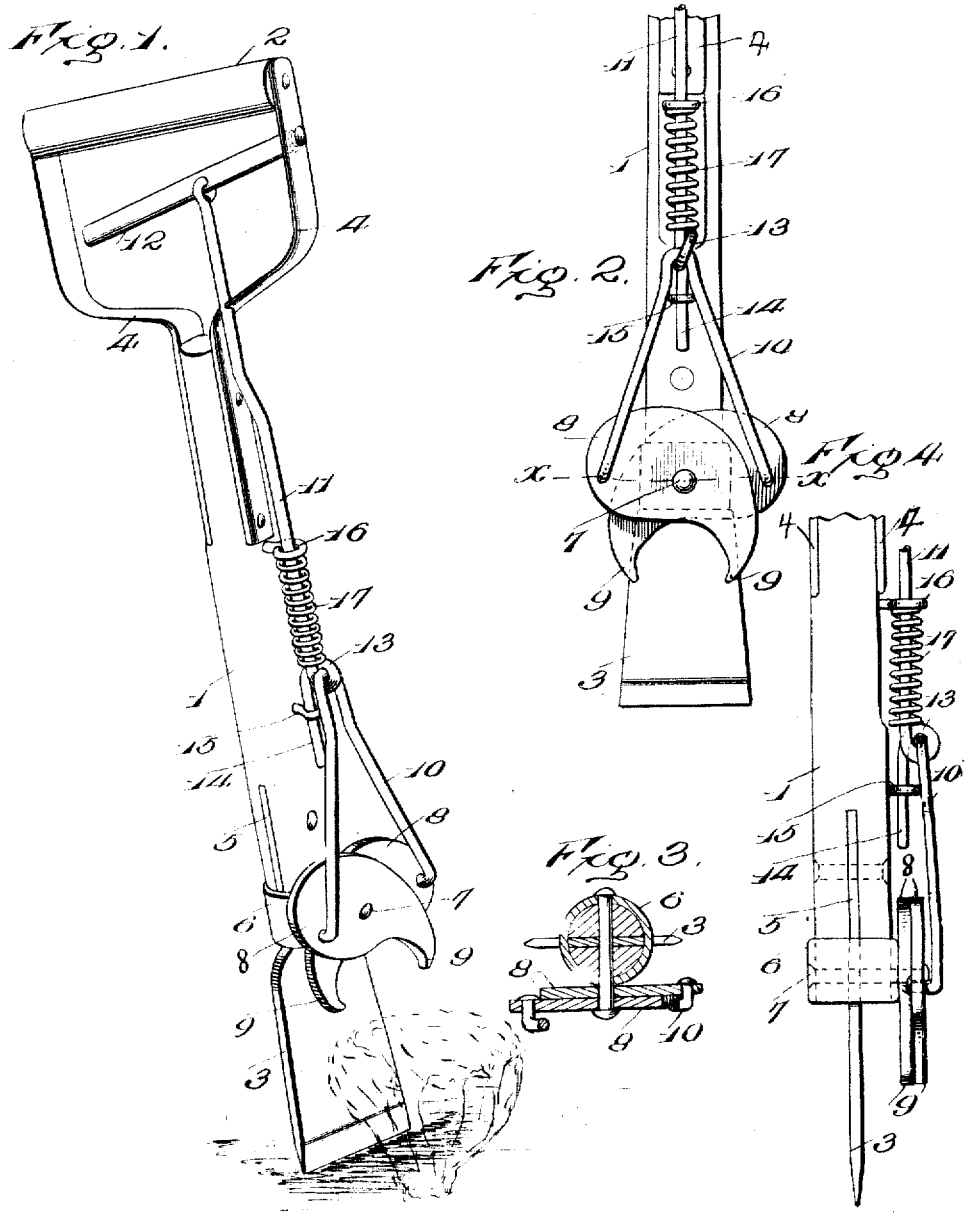

HIRAM S. WIMMER, OF EDNA, KANSAS, ASSIGNOR OF ONE-THIRD TO WILLIAM L. CONNEWAY.

COMBINED WEED CUTTER AND PULLER.

No. 905,039.　　　Specification of Letters Patent.　　　Patented Nov. 24, 1908.

Application filed March 18, 1908. Serial No. 421,927.

*To all whom it may concern:*

Be it known that I, HIRAM S. WIMMER, a citizen of the United States, residing at Edna, in the county of Labette and State of Kansas, have invented certain new and useful Improvements in a Combined Weed Cutter and Puller, of which the following is a specification.

The present invention provides an implement of novel construction particularly designed for removing weeds and which may be utilized for pruning purposes generally.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of an implement embodying the invention. Fig. 2 is a front view of the lower portion of the implement. Fig. 3 is a horizontal section on the line $x-x$ of Fig. 2. Fig. 4 is a side view of the parts shown in Fig. 2.

Corresponding and like parts are referred to in the following description and indicated in all the views of the drawings by the same reference character.

The implement comprises a staff 1 which is provided at one end with a handle 2 and at its opposite end with a blade 3, the latter serving either as a digger to penetrate the soil and cut the roots of weeds, or to be used as a cutter for lopping off branches of trees when the implement is adapted for pruning purposes. Strap irons 4 are secured to opposite sides of the staff 1 and their upper ends curve symmetrically in opposite directions and are attached to opposite ends of the handle 2. The blade 3 is provided with a shank 5, which is fitted in a kerf formed in the lower end of the staff. A ferrule 6 slipped upon the lower end of the staff secures the portions thereof separated by the kerf and adjacent to the blade 3. A rivet or pin 7 is passed through registering openings formed in opposite sides of the ferrule, the lower portions of the staff separated by the kerf and the shank 5 and serves to connect and secure said parts.

Plates 8 are arranged upon one side of the staff 1 adjacent to the blade 3 and are pivotally connected to each other and to the staff. The plates 8 are formed with hooks 9 which extend beyond the lower end of the staff and may constitute either clippers or cutters according to the specific adaptation of the implement. The plates 8 are arranged in planes approximately parallel with one another and with the plane of the blade 3 and are preferably mounted upon a projecting end of the rivet or pin 7, thereby simplifying the construction. The projecting ends of the plates spaced from the blade 3 are adapted to take hold of the weeds which have been cut or uprooted, or to sever branches from trees, depending upon the construction of said projecting parts 9. A spring 10 of approximately V-form has its end portions engaged with the plates 8 at opposite points, said spring serving normally to hold the hooks or projecting parts 9 of the plates separated. A rod 11 has connection with the upper end of the spring 10 and extends along the staff 1 and is attached at its upper end to a lever 12 fulcrumed at one end to a strap iron 4 and extending across the space formed between the upper oppositely curved ends of said strap irons so as to be conveniently gripped by the hand to be drawn upon when it is required to operate the plates 8 to cause the hooks to take hold of the weed or other part to be removed. The rod 11 is provided with an eye 13 near its lower end which receives the upper end of the spring 10 at the fork. The extension 14 of the rod beyond the eye 13 operates in a keeper 15 to direct the rod in its reciprocating movements. A second keeper 16 is secured to the staff 1 a distance from the keeper 15 and also receives the rod 11 which passes loosely therethrough. A spring 17 is mounted upon the rod 11 and is confined between the eye 13 and the keeper 15 and normally exerts a downward pressure upon the rod 11.

When using the implement for removing weeds, the blade 3 is thrust into the ground to loosen the roots of the weed, or to cut the same, as may be required, after which the lever 12 is operated to cause the hooks 9 to grip the weed, which is removed by withdrawing the blade by an upward movement of the implement. The weed thus removed may be deposited in a receptacle or thrown to one side. In the event of the blade 3 being sharpened and the projecting portions or hooks 9 constructed to operate as cutters, the implement may be used for pruning purposes, as will be readily comprehended.

Having thus described the invention, what is claimed as new is:

1. In an implement of the character specified, the combination of a staff provided with a blade, pivoted plates mounted upon the staff adjacent to the blade and adapted to coöperate therewith, and actuating means for operating said plates.

2. In an implement of the character specified, the combination of a staff provided at one end with a blade, plates mounted upon the staff and having projecting portions extended beyond the staff and spaced from the blade and adapted to coöperate therewith, and actuating means for said plates.

3. In combination, a staff, plates pivoted to each other and to the staff and having coöperating projecting parts, a spring of approximately V-form having its members connected with the said plates, and operating means mounted upon the staff for imparting movement to said spring, whereby the plates are caused to turn upon their pivot mounting to effect an opening and closing of the projecting ends thereof.

4. In combination, a staff, coöperating plates pivoted to the staff, a spring of approximately V-form having connection with said plates, an operating rod having connection with said spring at the fork thereof, keepers applied to the staff and having said rod operating therethrough, and a spring normally exerting a pressure upon the said rod to move it in one direction to hold the aforesaid plates in a given position.

5. In combination, a staff, a ferrule fitted upon the staff, a pin connecting the ferrule with the staff and having a projecting portion, plates mounted upon the projecting portion of the pin, and actuating means for said plates.

6. In combination, a staff, plates pivoted to one another and to the staff and having coöperating projecting parts, a spring of approximately V-form having its members connected with the said plates, an operating rod having an eye near one end to receive the forked end of the said spring, keepers applied to the staff and receiving the said rod, and a lever for operating the said rod.

7. The herein described implement, comprising a staff provided at one end with a handle, and having a kerf in its opposite end portion, a blade having a shank inserted in said kerf, a ferrule fitted upon the end of the staff, a pin connecting the staff, blade and ferrule and having a projecting end portion, plates mounted upon the projecting end of the pin and provided with coöperating projecting portions, a spring of approximately V-form having its members connected with said plates, an operating rod mounted upon the staff and having connection with the said spring, and a lever having connection with said operating rod.

In testimony whereof I affix my signature in presence of two witnesses.

HIRAM S. WIMMER. [L. S.]

Witnesses:
T. G. HARRIS,
J. H. HOOLE.